A. H. PETERSON.
Filtering Apparatus.
No. 211,640. Patented Jan. 28, 1879.
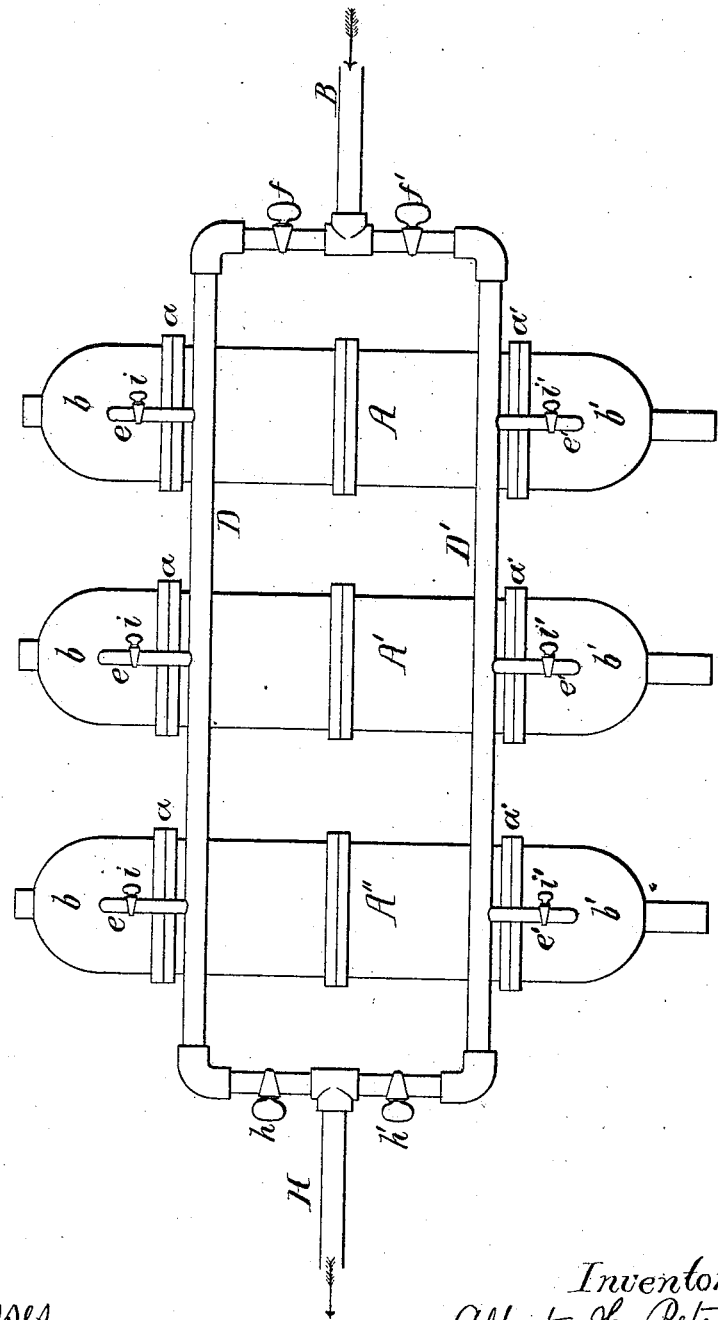
Witnesses
Henry Howson Jr
Harry Smith
Inventor
Albert H. Peterson
by his Attorneys
Howson and son

UNITED STATES PATENT OFFICE.

ALBERT H. PETERSON, OF PHILADELPHIA, PENNSYLVANIA ASSIGNOR OF ONE-HALF HIS RIGHT TO WILLIAM J. CUNNINGHAM, OF SAME PLACE.

IMPROVEMENT IN FILTERING APPARATUS.

Specification forming part of Letters Patent No. 211,640, dated January 28, 1879; application filed June 8, 1878.

*To all whom it may concern:*

Be it known that I, ALBERT H. PETERSON, of Philadelphia, Pennsylvania, have invented a new and useful Improvement in Filtering Apparatus, of which the following is a specification:

My invention relates to apparatus for the filtration of water on a large scale; and the main object of my invention is to thoroughly filter the entire volume of water and to lessen the cost of the filtering apparatus, a further object being to so combine a series of filtering-vessels with a system of pipes that the water can be directed either upward or downward through the said vessels, and that one or more of the same may be disconnected for cleansing or for repairs without interfering with the functions of the other vessels of the series.

In the accompanying drawing, three filtering-vessels, A, A', and A'', are shown; but the number of vessels will depend upon the desired filtering capacity of the apparatus.

It has not been deemed necessary to show the interior of the vessels, for any desired filtering medium may be used; but it should be so retained between the flanges $a$ $a'$ of each vessel that the water to be filtered may pass either upward or downward through the said filtering medium.

B is the inlet-pipe, which, by the manipulation of the cocks $f$ $f'$, can be made to communicate either with the pipe D or D', either of which can be made to communicate with the distributing-pipe H by manipulating the cocks $h$ $h'$. The pipe D communicates with the top $b$ of each vessel through a pipe, $e$, which is provided with a suitable cock, $i$, and the pipe D' communicates with the bottom $b'$ of each vessel through a pipe, $e'$, also furnished with a cock, $i'$. When the cocks $f'$ and $h$ are closed and the cocks $f$ and $h'$ opened, all the cocks $i$ and $i'$ being also open, the water from the inlet-pipe B will pass into the pipe D, thence through the pipes $e$ into the upper ends of all the filtering-vessels of the group, and will pass downward through the filtering mediums and through the pipes $e'$ into the pipe D', and thence into the distributing-pipe H.

It is advantageous to so construct filtering appliances that the water can be directed either upward or downward through the filtering medium, so that after the water has flowed in one direction for some time and the filtering medium has become foul the water may be directed in a contrary course, the first effect of this being to expel the foul matter which had been previously lodged in the filtering medium. This can be done in connection with a number of vessels by the system of pipes and cocks described above, for after the water has passed downward through the vessels, as set forth above, all that is necessary for the purpose of changing its course is to close the cocks $f$ and $h'$ and open the cocks $h$ and $f'$, when the water will pass from the inlet-pipe into the pipe D', thence through the pipes $e'$ and upward through the filtering-vessels, through the pipes $e$ into the pipe D, and thence to the distributing-pipe H.

Should it be necessary to remove one of the filtering-vessels, the cocks of its pipes $e$ and $e'$ must be closed, and the vessel thus disconnected from the pipes D D', no interruption of the filtering operations occurring during the disconnection of the vessel.

The main feature of my invention, however, consists in subdividing the supply of water into a number of small streams, and passing each of these streams through an independent filter of limited capacity, for by this means two important advantages are attained: first, economy, owing to the fact that a large filter is considerably more expensive and requires more attention than a number of small filters having a capacity equal in the aggregate to that of the large filter; and, second, more perfect filtration, due to the fact that in passing through a filter of limited capacity the water is brought into contact with every part of the filtering medium.

I claim as my invention—

1. The combination, in a filtering apparatus, of a feed-pipe and a delivery-pipe with a series of independent filters, each connected by means of suitable branches with the feed and delivery pipes, all substantially as and for the purpose herein set forth.

2. The combination of a series of filtering-vessels with an inlet-pipe, B, distributing-pipe H, and intermediate system of pipes and cocks, substantially as described, for the purpose specified.

In testimony whereof I have signed my name to this specification in the presence of two subscribing witnesses.

ALBERT H. PETERSON.

Witnesses:
RICHARD L. GARDINER,
HARRY SMITH.